US008155602B2

(12) United States Patent
Ziaei et al.

(10) Patent No.: US 8,155,602 B2

(45) Date of Patent: Apr. 10, 2012

(54) MEMS-BASED RADIO FREQUENCY CIRCULATOR

(75) Inventors: Afshin Ziaei, Vanves (FR); Matthieu Le Baillif, Orsay (FR)

(73) Assignee: Thales, Neuilly sur Seine (FR)

( * ) Notice: Subject to any disclaimer, the term of this patent is extended or adjusted under 35 U.S.C. 154(b) by 227 days.

(21) Appl. No.: 12/425,070

(22) Filed: Apr. 16, 2009

(65) Prior Publication Data

US 2009/0286491 A1 Nov. 19, 2009

(30) Foreign Application Priority Data

Apr. 18, 2008 (FR) ...................................... 08 02175

(51) Int. Cl.
*H04B 1/44* (2006.01)

(52) U.S. Cl. .............................. 455/78; 333/1.1; 455/19

(58) Field of Classification Search ................... 333/1.1; 455/19, 78, 80, 82

See application file for complete search history.

(56) References Cited

U.S. PATENT DOCUMENTS 6,043,727 A 3/2000 Warneke et al.
6,580,337 B1 6/2003 Valas
6,624,720 B1 9/2003 Allison et al.
6,992,629 B2 * 1/2006 Kerner et al. .......... 343/700 MS
7,042,397 B2 5/2006 Charrier et al.
7,297,571 B2 11/2007 Ziaei et al.
7,397,321 B2 * 7/2008 Hyun et al. .................... 333/1.1
2009/0237173 A1 * 9/2009 Ziaei .............................. 333/1.1

OTHER PUBLICATIONS

U.S. Appl. No. 12/302,829, Afshin Ziaei.
U.S. Appl. No. 12/302,525, Afshin Ziaei.
U.S. Appl. No. 12/441,226, Afshin Ziaei.

* cited by examiner

*Primary Examiner* — Lincoln Donovan
*Assistant Examiner* — William Hernandez
(74) *Attorney, Agent, or Firm* — LaRiviere, Grubman & Payne, LLP

(57) ABSTRACT

The invention relates to an RF circulator device with n ports allowing an RF signal to circulate in a single direction, where the circulator has at least three ports, an input port for receiving a radio frequency signal to be transmitted to a second port designed to be connected to an antenna port, an output port capable of being connected to a receiving device or a load, comprising a first and a second microswitches each comprising two armatures of which the first is a flexible membrane and the second comprises at least one zone of a signal line, both armatures being separated by a thickness of void or of gas, the device making it possible to connect the main line to ground planes by self-actuation of the membrane under the effect of an input signal power.

13 Claims, 5 Drawing Sheets

MEMS-BASED RADIO FREQUENCY CIRCULATOR

PRIORITY CLAIM

This application claims priority to French Patent Application Number 08 02175, entitled MEMS-based Radio Frequency Circulator, filed on Apr. 18, 2008.

TECHNICAL FIELD

The field of the invention is that of radio frequency RF circulators and their applications in radio frequency or microwave telecommunication systems such as radar systems or wireless telephony.

BACKGROUND OF THE INVENTION

An RF circulator is a device with n ports allowing an RF signal to circulate in a single direction. Consideration is given to a circulator with three ports p1, p2, p3. A signal injected into a port p1 is transmitted to the port p2 and insulated from the port p3, while a signal entering via the port p2 is transmitted to the port p3 and insulated from the port p1. This therefore gives a decoupling of the transmitted and received signals. A symbolic illustration corresponding to such a circulator the port p2 of which is connected to an antenna is given in FIGS. 1*a* and 1*b*. If the circulator receives a radio frequency signal on the impedance-matched port p1, this gives a low insertion loss path in the clockwise direction and great losses are observed in the opposite direction. The power is therefore directed virtually without loss to the port p2 and radiated by the antenna. The same thing applies from the port p2 to the port p3, and from the port p3 to the port p1. In this way the circulator has essential qualities of transmitting without loss in a given direction and of very greatly attenuating the reflected waves.

Circulators are notably used in telecommunication or radar systems according to the principle illustrated in FIG. 2. FIG. 2 illustrates schematically an example of a system for transmitting and receiving electromagnetic signals for applications notably of the radar type, normally called a T/R module consisting essentially of three stages as described below.

The first stage, the core of the CA system, serves to manage and process the signals received and transmitted. The second stage consists of power amplifier elements. These elements are divided into two functionalities, the high power amplifier normally called HPA, 11 which serves to give power to the signal leaving the first stage in order to be transmitted by the antenna and the low noise amplifier normally called LNA, 16 which serves to amplify the power of the signal received by the antenna while limiting interference to the maximum. These two components are extremely sensitive to the power received by the antenna: the LNA because the power that enters the latter must not exceed a certain threshold without which the component is damaged and destroyed; the HPA because it is always connected with a loopback to the output and must in no circumstances receive power on its output if the user does not wish to damage or even destroy it. It is for this reason that there are, in the third stage, elements called limiters 12 and 15 which are electronic components the function of which is to cut the microwave signal if the power of the latter exceeds a certain threshold. Also found in this third stage are elements called circulators 13 and 14. These are components called active components which direct an incoming stream to an output specific to the input used. For example, from the port 1 to the port 2, from the port 2 to the port 3 etc. hence the name of circulator. This physically means that irrespective of the impedance of the output circuit, there is practically no return to the input of the circulator. If there has to be a reflection, the energy is considered to be an incoming stream via the first output and is therefore directed to the next output, almost perfectly insulating the input.

Currently this type of transmit/receive system comprises ferromagnetic-material-based circulators and diode-based limiters.

The existing defects are mainly:

- the high cost of these components which are not easily reproducible because they require human intervention to be correctly set;
- the losses generated by these components of the order of 4 to 8 dB in their frequency band which is itself very narrow (0.2 to 2 GHz) for the circulators and of the order of 1 dB for the diode-based power limiters.

These components currently occupy 80% of the space in a telecommunication system and are an additional obstacle to miniaturization. Since the circulators currently employed are ferrite-based components, they are by nature active components and consume energy; they are also very bulky (of the order of 70% of the weight relative to the volume of the T/R module) and because they are difficult to reproduce are very expensive.

The diodes for their part are components that have considerable costs and the losses generated by these components are in the order of 1 dB. Furthermore, the diodes occupy a considerable proportion of the space in the telecommunication systems and thereby represent an additional obstacle to miniaturization.

It has already been proposed in the prior art to use microwave microswitches also called RF MEMS switches. They are microdevices of the capacitive type operating like switches, microdevices that are called microswitches in the rest of the description.

The microswitches of the capacitive type are particularly valued in microwave applications, notably for their low response time allied with not very high control voltages ranging from a few volts to a few tens of volts. Advantageously they are very small, of millimetric size (2 to 10 $mm^2$), that is on average ten times smaller than a ferromagnetic circulator and much lighter. They consume very little. They are not very costly to produce because they use the manufacturing techniques that are usual in microelectronics, from a substrate that is usually made of silicon, and are very easy to reproduce. Their insertion losses are very low, usually in the order of 0.1 to 0.2 dB over a very wide frequency band, 18 to 19 GigaHertz. More precisely, in this solution, serial microswitches are proposed: one input signal line and one output signal line in the extension of one another, separated by a switching zone, and electrically insulated, and, above the switching zone, a flexible membrane resting on pillars. The switching zone is covered with a dielectric. The membrane is either in the rest position, up, the capacity formed by the switching zone, the dielectric and the membrane having a low Coff value, so that the two signal lines are insulated, either in the low position so that both portions of line are coupled in a capacitive manner, the capacity formed by the switching zone, the dielectric and the membrane having a high Con value, allowing the transmission of a radio frequency or microwave signal. The control of the membrane is a voltage control applied in an appropriate manner in the switching zone, the membrane being taken to a reference potential (electric ground) by the pillars. The switching performance (transmission, insulation) depends notably on the Con to Coff ratio which must be as high as possible.

The circulator comprises at least one first and one second contact pads in order to apply the control voltages in the on or off state on at least one of the portions of the control electrode of the first microswitch and of the second microswitch. The activation voltages are in the order of from one volt to a few tens of volts. The microswitches may be controlled simultaneously in the off state or one in the on state and the other in the off state.

BRIEF DESCRIPTION OF THE INVENTION

In order to further reduce the costs of this type of circulator, the present invention proposes a new type of circulator comprising self-actuated components.

More precisely, the subject of the present invention is a circulator with at least three ports, an input port for receiving a radio frequency signal to be transmitted to a port designed to be connected to a transmit/receive antenna called the antenna port, an output port capable of being connected to a receiving device or a load, characterized in that it comprises:

- a first and a second microswitches with electrostatic actuation of the capacitor type formed on one and the same substrate and each comprising two armatures of which the first is a flexible membrane and the second comprises at least one zone of a signal line, both armatures being separated by a thickness of void or of gas;
- the antenna and output ports being placed on a main signal line, the input port being situated on a secondary signal line;
- the first microswitch being placed so as to connect the main signal line and the secondary signal line by self-actuation of the membrane under the effect of an input signal power;
- the second microswitch having a membrane making it possible to connect the main line to ground planes by self-actuation of the membrane under the effect of an input signal power;
- the microswitches being separated by a distance of the order of a quarter of the wavelength corresponding to the frequency of the signal.

According to a variant of the invention, the main signal line is a discontinuous line.

According to a variant of the invention, the secondary signal line is a continuous line.

According to a variant of the invention, the secondary line comprises a ground element separated by a distance of the order of a quarter of the wavelength corresponding to the frequency of the signal.

According to a variant of the invention, the main and secondary lines are made of gold and/or copper and/or titanium/tungsten alloy.

According to a variant of the invention, the main and secondary lines also comprise a top layer made of an insulating material at the thinned portions situated beneath the membranes.

According to a variant of the invention, the insulating material is made of PZT or of $ZrO_2$ or of $Si_3N_4$ or in any other dielectric the relative permittivity of which must be adapted to the working frequency of the element.

A further subject of the invention is a module for transmitting/receiving radio frequency signals comprising an antenna, a first stage for processing the radio frequency signals transmitted and received, a second stage for amplifying the said signals and an intermediate stage comprising at least one circulator according to the invention.

According to a variant of the invention, the intermediate stage also comprises at least one power limiter.

According to a variant of the invention, the transmit/receive module comprises a power limiter on the output port in the direction of the receiver or of the load and/or a second power limiter on the antenna port.

According to a variant of the invention, the power limiter or limiters comprises or comprise a main line with an input for receiving an incident power and an output, their main line comprising a microswitch with electrostatic actuation of the capacitor type comprising two armatures of which the first is a flexible membrane and the second comprises at least one zone of the main line, both armatures being separated by a thickness of void or of gas, the said microswitch also comprising two ground planes connected by the said membrane.

According to a variant of the invention, the microswitch of the limiter or limiters is self-actuatable by an incident power greater than a threshold value so as to place the said zone of the main line in contact with the two ground planes and thereby block the microwave signal.

BRIEF LIST OF THE DRAWINGS

The invention will be better understood and other advantages will appear on reading the following description given in a non-limiting manner and using the appended figures amongst which:

FIGS. 1*a* and 1*b* illustrate the conventional operating modes of a circulator;

Figure 4A:
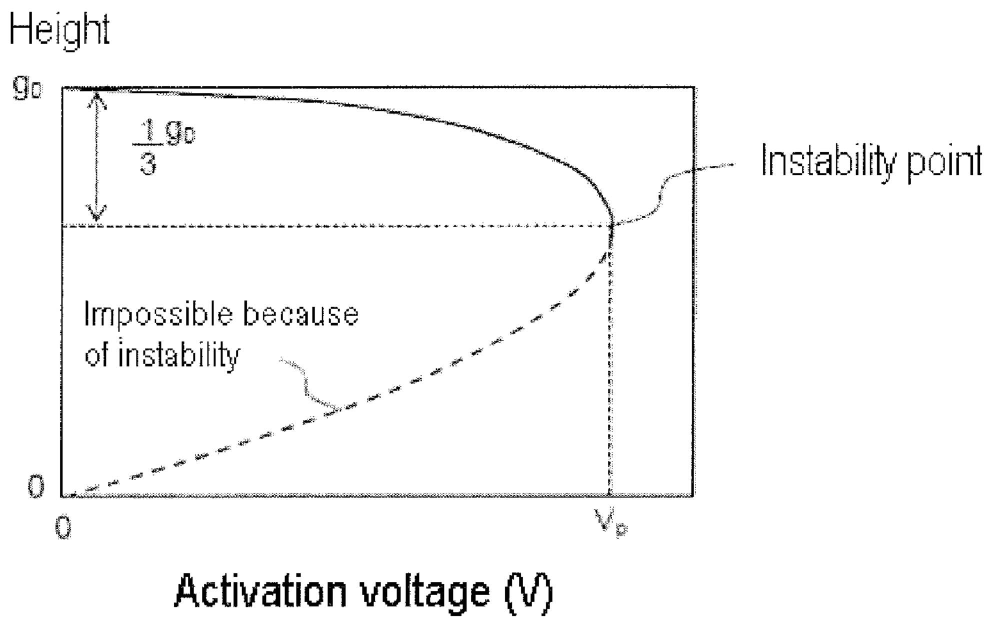
Figure 4B:
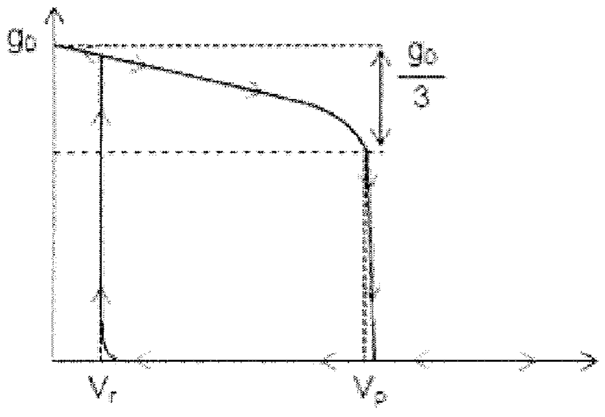
Figure 6:
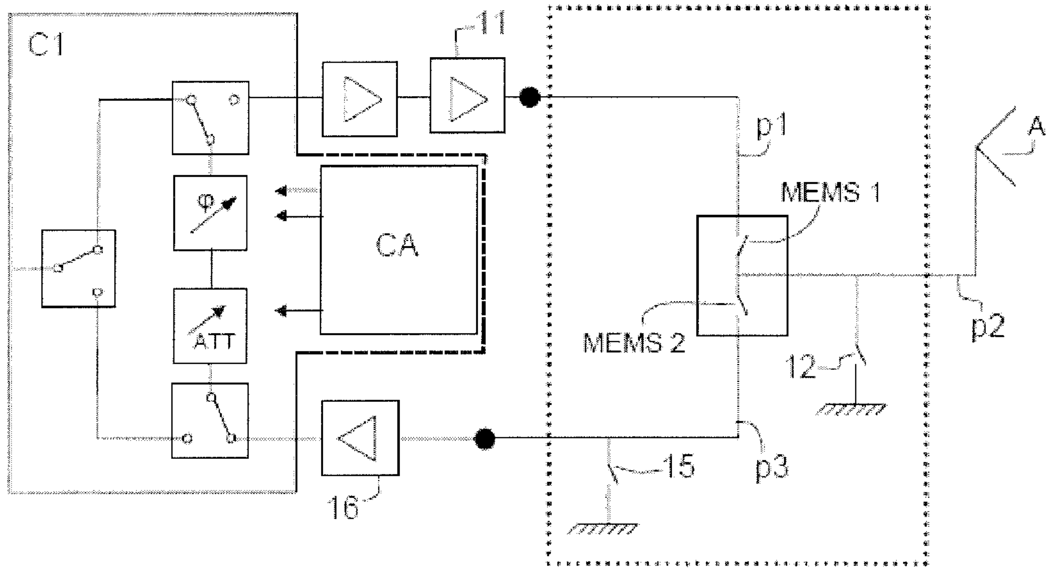

FIGS. 4*a* and 4*b* illustrate respectively the change in the gap separating the membrane from the coplanar line zone as a function of the actuation voltage of the said membrane and the cycle being able to be carried out by the membrane under the action of a control voltage;

FIGS. 5*a*, 5*b*, 5*c* and 5*d* illustrate various views of a microswitch used in a circulator according to the invention;

FIG. 6 illustrates the intermediate stage of a transmit/receive system incorporating a circulator according to the invention.

DETAILED DESCRIPTION

In general, the circulator that is the subject of the present invention comprises two microswitches based on RF MEMS components, with electrostatic activation.

Figure 3:
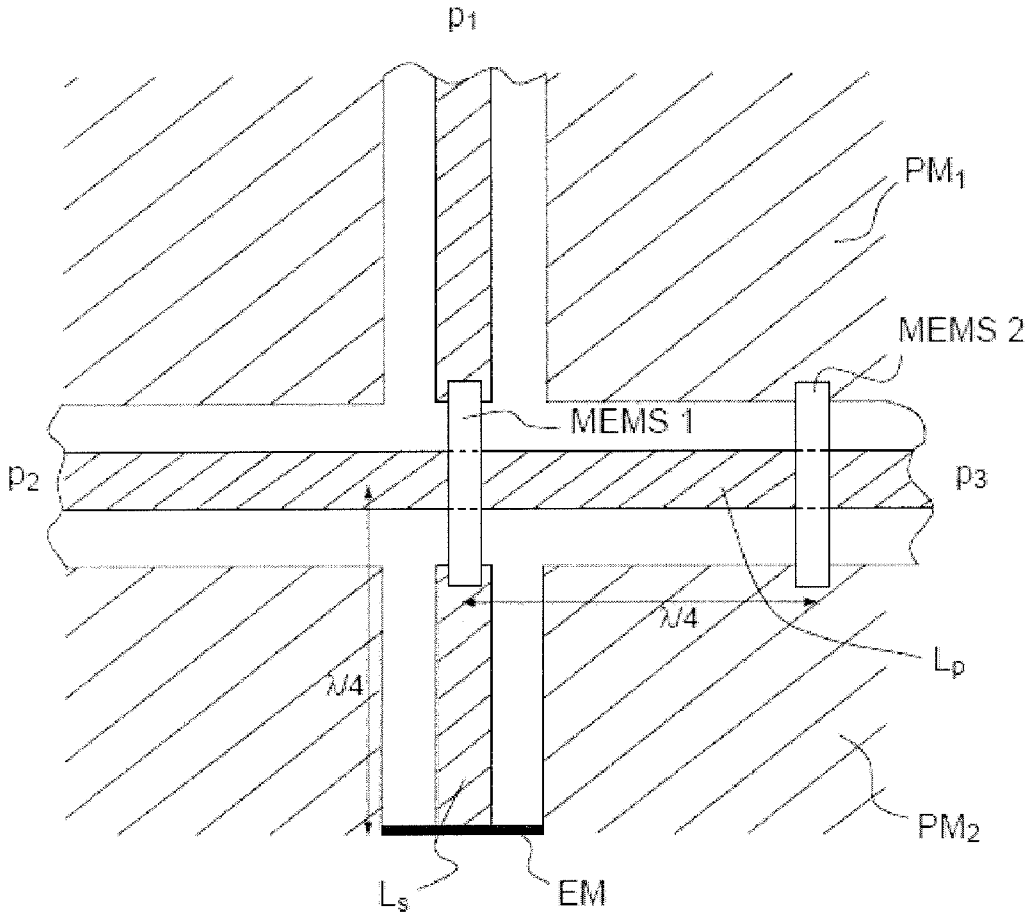
FIG. 3 illustrates an example of a circulator according to the invention.

FIG. 3 represents a top view of an example of a circulator according to the invention. A main RF continuous line, Lp, comprises the output port p3 towards a receiver or a load and the antenna port p2 towards a transmit/receive antenna. This main line, Lp, forms a cross with a discontinuous secondary Rf line, Ls, the said secondary line comprising the input port p1 that is capable of receiving a radio frequency signal. A first microswitch MEMS1 is situated at the crossing of the main and secondary lines, making it possible, when the membrane is lowered, to place the two discontinuous elements of the secondary line in contact. Moreover, a second microswitch MEMS2 is also positioned on the main line towards the port p3 and makes it possible to short-circuit the said main line to ground, in the lowered position of the membrane of the said second microswitch. Specifically, ground planes PM1 and PM2 are situated on either side of the secondary line.

The two microswitches are separated by a distance equal to a quarter of the wavelength λ corresponding to the frequency of the operating signal of the said circulator and the secondary line also comprises a ground element EM (for electromagnetic grounds, similar to a ground for the direct current, these grounds EM correspond to a reference potential for the central line) situated at a distance also equal to a quarter of the wavelength λ.

Therefore, when the two microswitches are in the state 1 position, corresponding to membranes not lowered, a signal received from the antenna may be propagated along the main line towards the port p3 and may not circulate towards the ports p1 and the ground element EM.

When the two microswitches are in the state 2 position, corresponding to membranes lowered, a signal from the port p1 may circulate in each of the four branches of the cross formed.

Specifically, a portion of the signal passes towards the port p3 but the MEMS2 is in position to short-circuit the signal, and the signal travels outbound over a distance of λ/4 and returns in phase opposition of the said outbound signal. Similarly, the portion of signal towards the ground element EM also travels an outbound distance over a distance of λ/4 in phase opposition with a return signal over the said same branch of the cross.

By totaling the various signals in phase opposition, all that remains is a signal towards the port p2 of the antenna.

Hence it is possible to summarize the two states of the circulator:

- state 1: the MEMS1 and MEMS2 are in the high position, the circulator operates from p2 to p3.
- state 2: the MEMS1 and MEMS2 are in the low position, the circulator operates from p1 to p2.

According to the invention, the great value of this type of circulator is that it operates by virtue of the presence of two microswitches that are self-actuatable and therefore have no operating voltage to consume. Specifically, any radio frequency signal has an associated power which in fact is the equivalent of an RMS voltage and current. If the RMS voltage of the signal exceeds a certain threshold, a phenomenon of self-activation of the membrane occurs which short-circuits the microwave signal to ground, protecting the components situated downstream.

The movement of the membrane of this RF MEMS switch during actuation follows the path illustrated in FIG. 4*a* which supplies the distance of the membrane overhanging the coplanar line zone as a function of the actuation voltage of the said membrane called height.

The voltage Vp is the activation voltage (Vp for Voltage pull) determined by the following equation:

$$V_p = \sqrt{\frac{8kg_0^3}{27\varepsilon_0 wW}}$$

where wW is the facing surface area, $g_0$ is the initial gap and k is the coefficient of stiffness of the membrane.

The release voltage $V_r$ is obtained, defined according to the following formula:

$$V_r = \sqrt{\frac{2k(g_0 - t_d)t_d^2}{\varepsilon'\varepsilon_0 wW\varepsilon_r^2}}$$

where $t_d$ is the thickness of the dielectric separating the line from the membrane and $\in_r$ is the permittivity of the dielectric.

This gives the cycle shown in FIG. 4*b* for the movement of the membrane as a function of the applied voltage.

The power of the signal passing through the RF MEMS corresponds to an average voltage Veq. Three configuration situations are possible:

- first situation: the voltage Veq generated by the signal is greater than the voltage Vp; this is the case of self-actuation for a switch of this sort. This means that the simple fact of passing the signal through the RF MEMS causes its actuation.
- second situation: the voltage Veq lies between the voltages Vr and Vp; this is the case of self-hold. This means that the simple fact of passing the signal through the RF MEMS prevents the membrane from rising after actuation, self-hold, but without thereby causing a self-actuation.
- third situation: the voltage Veq is less than the voltage Vr; the MEMS operates in a simple manner; the signal does not disrupt the operation of the RF MEMS.

Described below in greater detail will be an example of a microswitch used in a circulator according to the invention and notably the MEMS2 which, in a lowered position, makes it possible to connect the central line to the ground planes.

Figure 5A:
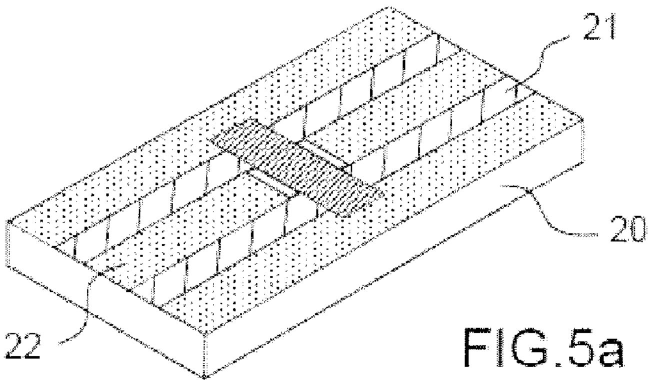
Figure 5B:
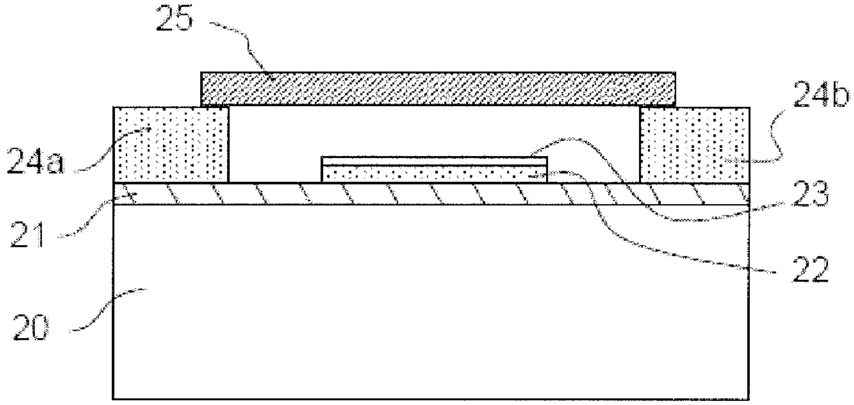
Figure 5D:
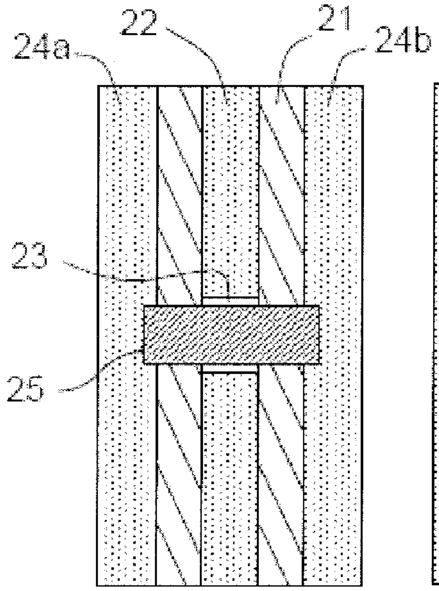
Figure 5C:
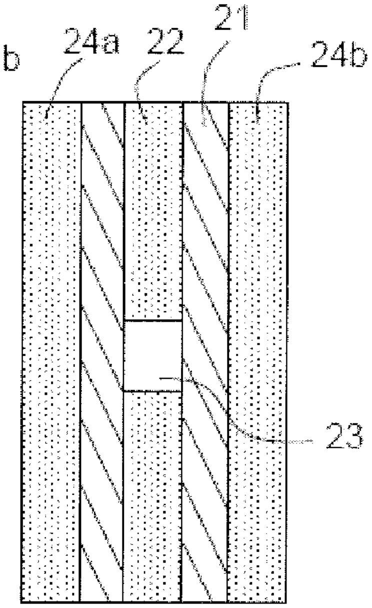

FIGS. 5*a*, 5*b*, 5*c* and 5*d* illustrate respectively a view in perspective, a view in section, a top view before production of the membrane and a top view after production of the membrane. On a silicon substrate 20, covered with a layer 21 of dielectric of the $SiO_2$ type, a microwave line 22 is made typically in gold, covered according to the prior art with a layer of dielectric 23 of the PZT type. Pillars 24*a* and 24*b* make it possible to connect ground lines 24 and support the membrane consisting of a layer of conductive material 25. FIG. 5*c* shows the microwave line 22 covered with a layer of piezoelectric material 23, while FIG. 5*d* shows the membrane 25 overhanging the said microwave line 22 covered with the dielectric layer 23. Typically the thicknesses of the layers are respectively:

- layer 21: in the order of 1 to 2 microns;
- layer 22: in the order of 0.5 to 0.7 microns in the thinned portion, and approximately 5 μm in the non-thinned portions beneath the membrane;
- layer 23: in the order of 0.2 to 0.4 microns;
- membrane 25: in the order of 500 to 700 nanometers.

Figure 1A:
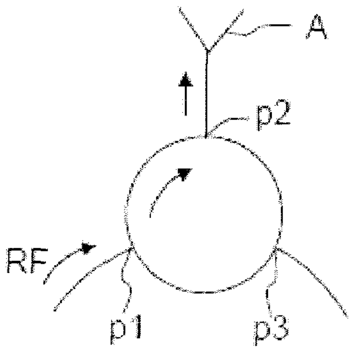
Figure 1B:
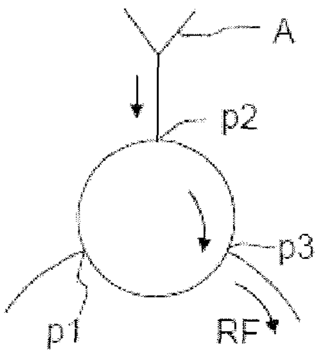
Figure 2:
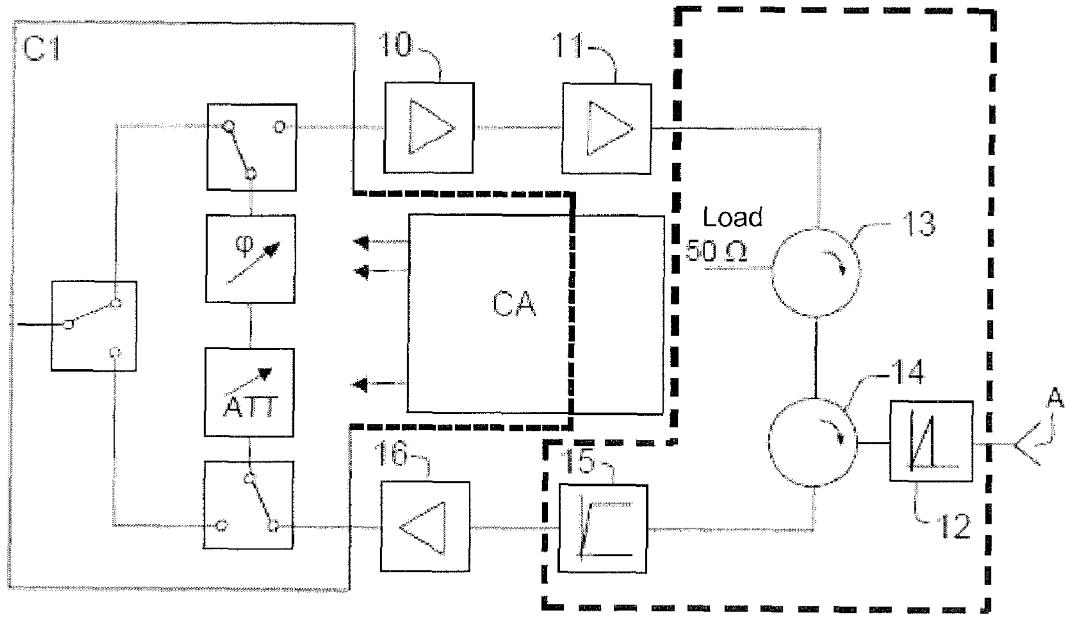
FIG. 2 illustrates an example of a system for transmitting and receiving electromagnetic signals for applications notably of the radar type according to the prior art.

FIG. 6 illustrates the intermediate stage of a transmit/receive system comprising power limiters and a circulator according to the invention, such a system typically being able to be that illustrated in FIG. 2.

Therefore, according to the invention, the third stage of this transmit/receive system comprises, at the output of the transmit signal amplifier 11, a circulator consisting of two microswitches MEMS1 and MEMS2 according to the invention; this third stage also comprises, for the receive microwave signal, a first limiter 12 between the circulator and the antenna port p2 and a second limiter 15 the main line of which is connected at the input to the circulator comprising the two microswitches MEMS1 and MEMS2 and at the output to an amplifier 16, LNA.

The value of the circulator and of the RF MEMS-switch-based limiters is that they consume little or no energy in self-actuation mode, that they are very small and therefore allow a considerable saving in space and weight; the circulator and the RF MEMS-switch-based limiters are furthermore very easily reproducible and are therefore extremely cheap.

We hereby claim:

1. Circulator with at least three ports (p.sub.1, p.sub.2, p.sub.3), an input port (p.sub.1) for receiving a radio frequency signal (input signal) to be transmitted to a port (p.sub.2) designed to be connected to a transmit/receive antenna (A) called the antenna port, an output port (p.sub.3) capable of being connected to a receiving device or a load, comprising:

a. a first and a second microswitches (MEMS1, MEMS2) with electrostatic actuation of the capacitor type formed on one and the same substrate and each comprising two armatures of which the first is a first membrane and the second comprises at least one zone of a signal line, both armatures being separated by a thickness of void or of gas;

b. the antenna and output ports being placed on a main signal line, the input port being situated on a secondary signal line;

c. the first microswitch being placed so as to connect the main signal line and the secondary signal line by self-actuation of the first membrane under the effect of an input signal power;

d. the second microswitch having a second membrane making it possible to connect the main line to ground planes by self-actuation of the membrane under the effect of an input signal power; and e. the microswitches being separated by a distance of the order of a quarter of the wavelength corresponding to the frequency of the input signal.

2. Circulator according to claim 1, wherein the main signal line is a discontinuous line.

3. Circulator according to claim 1, wherein the secondary signal line is a continuous line.

4. Circulator according to claim 1, wherein the secondary line comprises a ground element separated by a distance of the order of a quarter of the wavelength corresponding to the frequency of the input signal.

5. Circulator according to claim 1, wherein the main and secondary lines are made of gold and/or copper and/or titanium/tungsten alloy.

6. Circulator according to claim 1, wherein the main and secondary lines also comprise a top layer made of an insulating material at the thinned portions situated beneath the first and second membranes.

7. Circulator according to claim 6, wherein the insulating material is made of PZT or of ZrO.sub.2 or of Si.sub.3N.sub.4.

8. Module for transmitting/receiving radio frequency signals comprising:

a. an antenna;

b. a first stage for processing the radio frequency signals transmitted and received;

c. a second stage for amplifying the signals; and d. an intermediate stage comprising at least one circulator according to claim 1.

9. Transmit/receive module according to claim 8, wherein the intermediate stage also comprises at least one power limiter.

10. Transmit/receive module according to claim 9, comprising a first power limiter on the output port in the direction of a receiver or of a load and/or a second power limiter on the antenna port.

11. Transmit/receive module according to claim 10, wherein the first and/or second power limiter(s) comprises or comprise a main line with an input for receiving an incident power and an output, their main line comprising a microswitch with electrostatic actuation of the capacitor type comprising two armatures of which the first is a flexible membrane and the second comprises at least one zone of the main line, both armatures being separated by a thickness of void or of gas, the microswitch also comprising two ground planes connected by the flexible membrane.

12. Transmit/receive module according to claim 11, wherein the microswitch of the first and/or second power limiter(s) can be actuated by a voltage.

13. Transmit/receive module according to claim 11, wherein the microswitch of the first and/or second power limiter(s) is self-actuatable by an incident power greater than a threshold value so as to place the said zone of the main line in contact with the two ground planes and block the radio frequency signal.

* * * * *